United States Patent Office 3,457,174
Patented July 22, 1969

3,457,174
FERROMAGNETIC MATERIALS AND PROCESSES FOR THEIR MANUFACTURE
Andre Deschamps and Nicolle Georgette Suzanne Bernard, Paris, France, assignors to International Telephone and Telegraph Corporation, New York, N.Y., a corporation of Maryland
Filed Dec. 27, 1965, Ser. No. 516,642
Claims priority, application France, Dec. 29, 1964, 173
Int. Cl. C04b 35/64, 35/36; H01f 1/10
U.S. Cl. 252—62.57
4 Claims

ABSTRACT OF THE DISCLOSURE

A spinel ferrite material and a method for manufacturing same wherein said material is usable in a band of frequencies ranging from 100 mHz. to 10,000 mHz. This spinel ferrite is prepared by forming a titanate having a corundum structure, and mixing the corundum titanate with metal oxides. Then a compound is prepared including the tetravalent metal titanium and bivalent metal oxides. This compound is combined with the corundum titanate-metal oxides mixture and sintered to form the final spinel ferrite. The manufacturing process involved allows sintering at relatively low temperatures (approximately 1200° C.).

---

The present invention relates to ferromagnetic materials, and more particularly to such materials adapted for use in devices using gyromagnetic effects in the microwave region.

The materials, embodying the invention, are prepared from fine powders of metallic oxide, powders which, after mechanical preparation of a homogeneous mixture, are compressed into cores of desired geometric form, which are then submitted to suitable heat treatments. These materials crystallise in the cubic system and belong to the group of "spinels." They are usually designated by the name "ferrites."

Ferrites according to the invention present remarkable properties and mark a very important progress over ferrites actually known. They equally present manufacturing advantages as they contain certain oxides that allow sintering at relatively low temperatures (about 1200° C.). Because of this they are of particular interest. Due to this sintering temperature, the apparent density sufficiently approximates the density deduced from X-ray measurement of the crystal lattice to alow their use at microwave frequencies. On the other hand, known ferrites of manganese and of magnesium, not containing such oxides, must be sintered at temperatures, higher than 1400° C. to give them properties suitable for use at microwave frequencies, but not having temperature stability as good as the above-mentioned ferrites.

It is an object of the present invention to obtain ferrites capable of functioning, according to their composition, in a band of frequencies from 100 mHz. to 12,000 mHz., and in particular in a zone of relatively low frequencies, from 100 mHz. to 3,000 mHz.

Up to the present the method employed for ferrites useable in relatively low frequency band was to start with classical ferrites, nickel or manganese-magnesium, ferrites which have been found to have good properties in the neighbourhood of 10,000 mHz. Then in order to make them useable in the lower bands of frequencies, their saturation moments are decreased by adequate substitutions of non-magnetic ions or less magnetic trivalent ions, such as aluminium or chromium, for the trivalent iron ions. These ferrites, for the most part, have too high an attenuation in the bands of low frequencies. Furthermore the substitution of alumina $Al_2O_3$ for the iron oxide $Fe_2O_3$ in the ferrite necessitates prohibitive industrial conditions of sintering (temperatures of the order of 1500° C.) to obtain the required density.

To obtain ferrites responding to the imposed conditions, it was then necessary to start with a ferrite capable of operating in the neighbourhood of 10,000 mHz. and presenting qualities as good as possible, in order to obtain ferrites useable at lower frequencies.

It has now been found that ferrites meeting the object stated above can be manufactured by a new combination of methods which have been previously disclosed in respective French Patents No. 1,354,232 and 1,354,231.

Briefly, as described in the French Patent No. 1,354,232, the first method involves preparing a spinel ferrite from a suitable mixture of bivalent and trivalent oxides to which is added a presintered titanate of corundum structure. The corundum titanate partially substitutes for iron oxide $Fe_2O_3$ in the spinel structure of the final ferrite, i.e., the trivalent ions are partially substituted in the structure by bivalent ions associated with quadravalent ions. This first method, therefore, can be termed: "the method of partial substitution." The next step in our method is to diminish the saturation moment of the ferrite. This is achieved by employing the method as described in French Patent 1,354,231. This method consists essentially of preparing a spinel ferrite from a suitable mixture of bivalent and trivalent oxides to which is added a presintered titanate of spinel structure. The spinel titanate forms a solid solution with the spinel ferrite formed by the bivalent and trivalent oxides, so as to form a final ferrite of spinel structure. This latter method can therefore be termed "the method of solid solution."

The substitution of ions $Fe^{+++}$ by ions $Al^{+++}$, for example, in the structure is always accompanied by a very appreciable lessening of all the properties, whilst the method of solid solutions corresponds to a solution of the prepared ferrite keeping all its efficiency with a non-magnetic product of the same structure, such as, for example, titanate of magnesium $[TiO_2,2MgO]$. This compound, in fact, leads to a decrease of the moment of saturation of the ferrite, but has equally the advantage of presenting, at microwave frequencies, very interesting dielectric properties.

The interest of the above described process, comprising a substitution, followed by a solid solution, will be best understood by the following description.

The ferrites, forming the object of the present invention, are characterised by a molecular composition given by the formula:

$$X[xLO, yR_2O_3, z(TO_2QO)] \cdot Y[TO_2 2EO] \quad (1)$$

in which

$$X+Y=100 \text{ and } 8.5 \leq Y \leq 90$$

and $$0.96 \leq x \leq 1.04,\ y+z=2-x \text{ and } 0.01 \leq z \leq 0.9$$

in which L, Q and E represent one or more metals in the bivalent state such as:

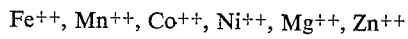
$$Fe^{++},\ Mn^{++},\ Co^{++},\ Ni^{++},\ Mg^{++},\ Zn^{++}$$

in which R represents one or more metals in the trivalent state such as:

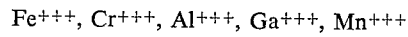
$$Fe^{+++},\ Cr^{+++},\ Al^{+++},\ Ga^{+++},\ Mn^{+++}$$

ferric oxide $Fe_2O_3$ constituting at least ¾ of $yR_2O_3$, and in which T represents one or more tetravalent metals such as: $Ti^{++++}$, $Sn^{++++}$.

The molecular composition of these ferrites differs from the molecular compositions given in French Patent No. 1,354,232. In fact, to have the compositions of this patent, it was necessary that $Y=0$, which is excluded in the present invention and it was necesary to choose X equal to any whole number whatever such that (with $X=50$ for example):

$$48 \leq Xx \leq 52, Xy+Xz=100-Xx$$

and $$0.5 \leq Xz \leq 45$$

The molecular composition of the ferrites, according to the present invention, also differs from the molecular compositions given in French Patent No. 1,354,231, since, in the present invention, z is always different from zero.

The materials according to the invention can be obtained by a known process of ferrite manufacture which consists in mixing in suitable proportions, metallic oxides LO, $R_2O_3$, $TO_2$, QO and NO, in compressing the mixture obtained and causing it to be submitted to an appropriate heat treatment.

But a preferred process of manufacture of materials according to the invention, and which is that which has been used in the examples given below, consists in realizing a partial substitution of the ions of valence three, by ions of valence two associated with tetravalent ions in proportions indicated by the formula:

$$X[x'LO, y'R_2O_3, z'(TO_2QO)]$$

the values $x'$, $y'$ and $z'$ being connected to the values of $x$, $y$ and $z$ as a function of the valencies of the starting oxides used.

It is in fact known that the bodies ($TiO_2NiO$), ($TiO_2MnO$) and ($TiO_2MgO$), for example, present the corundum group structure of spacing $D_{3d}^6$ and can be perfectly substituted for ferric oxide, $Fe_2O_3$, in the spinel structure. Starting then with a quantity of oxides of bivalent and trivalent metals in suitable proportions, there is added, for example, the compound $TiO_2NiO$) sintered at about 1000° C. in air for one hour.

There is then prepared a homogeneous mixture of the oxides by known processes, in a mill with steel balls and following the proportions indicated by the formula $$X[x'LO, y'D_2O_3, z'(TO_2QO)]$$

Then, in a second stage, a preferred process of manufacture of the materials according to the invention, and it is this which has been used in the examples given later, consists in realising a solid solution of the ferrites $[x'LO, y'R_2O_3, z'TO_2QO]$ with the products $[TO_22EO]$.

It is in fact known that the bodies $[TiO_22MgO]$ and $[TiO_22ZnO]$, for example, present the spinel structure of the group of symmetry $F-d3m$ ($O_h^7$ of Schoenflies).

A quantity of bivalent and tetravalent oxides, is started with, in suitable proportions given by the formula $[TO_22EO]$ milled, then sintered in air at 1000° C. for about one hour. The compound $$X[x'LO, y'R_2O_3, z'(TO_2QO)] \quad (2)$$

milled, is added to it, either raw, or, preferably after sintering at 1000° C., equally in air, for about one hour.

There is then prepared a homogenous mixture of the compounds in a mill with steel balls. The powder obtained is compressed into cores of the desired geometric form. The compression is made without any addition of lubricant, at pressures of the order of several metric tons per cm.², and going even to high pressures, for example of 7 to 8 metric tons per cm.². This avoids long and difficult operations which would be necessary to eliminate added products.

The cores obtained are submitted to a heat treatment, under an atmosphere of oxygen, comprising a slow rise temperature, with a first level, lasting several hours, at 800° C. This level at 800° C., temperature of formation of the ferrite, is favourable for obtaining a good density. The cores are then heated to a second level of about 1200° C. lasting from 4 to 5 hours. The duration of cooling, which is carried out equally under oxygen, is about 20 hours. This slow cooling favours the formation of solid solutions.

For focussing attention on the ferrites and for appreciating the properties of the ferrites obtained, the technique of the Faraday rotation has ben used. In practice, a plane polarized wave, traversing a cell with Faraday rotation containing a ferrite sample, undergoes the following modifications:

Its plane of polarization turns through an angle $\theta$, designated hereafter by Faraday rotation, A certain quantity of energy is lost by absorption in the material:

this represents the losses due to the ferrite sample, it is called the attenuation $\alpha$, the logarithm of the ratio between the power obtained at the output of the cell without ferrite and the power obtained at the output of the cell after introduction of the ferrite, it is expressed in decibels.

The quality factor is defined as the ratio $\theta/\alpha$ of the Faraday rotation in degrees to the attenuation in decibels.

The characteristics and the advantages of the invention will be best understood with the help of the detailed description given hereafter of the examples, given in non-limiting fashion and by means of the accompanying drawings.

A basic ferrite is first sought of molecular composition following Formula 2, having optimum properties at high frequencies.

A start is made from pure oxides, containing less than 0.05% by weight of impurities. These oxides are milled and intimately mixed in an iron mill with steel balls for 24 hours.

In varying the molecular percentage of manganese oxide before milling from 0 to 14 and that of the oxide of magnesium from 44 to 48, whilst keeping the condition $Xy+Xz=100-Xx$ for the formed ferrite, the values giving the better compromise between a high Faraday rotation and an acceptable attenuation are 9MnO and 46MgO. The molecular percentage of manganese oxide is conventionally related to the number of atoms of manganese, that is conventionally represented by MnO, although, in practice, different oxides of manganese such as $MnO_2$, $Mn_3O_4$, etc. could be used.

A ferrite of the following molecular composition before milling is then studied:

$$40Fe_2O_3, 9MnO, 46MgO, 5(TiO_2NiO) \quad (3)$$

in which the compound ($TiO_2NiO$) has been previously sintered at 1000° C. in air for one hour. The mixture 3 is then compressed into the desired form and submitted to a heat treatment at the temperature of 1200° C. for 4 hours under an atmosphere of oxygen. Cooling is carried out in 20 hours.

The ferrite specimen had the following form: two cores of 37 mm. length joined by their base of 6.4 mm. diameter. These dimensions allow a very satisfactory adaptation of the measuring cell constituted by a circular wave guide of 22.9 mm. diameter and by a joint turning with a graduated drum.

The results, obtained at the frequency of 9,575 mHz. of the attenuation α, of the Faraday rotation θ and of the factor of merit θ/α, for different values of the continuous longitudinal field at the temperture of +20° C. are set out in Table 1.

TABLE I

| HOe | 0 | 3.4 | 6.8 | 10 | 13.5 | 17 | 22.5 | 29 | 34 | 67.6 | 113 | 225 | 338 |
|---|---|---|---|---|---|---|---|---|---|---|---|---|---|
| α dB | 0.16 | 0.16 | 0.19 | 0.19 | 0.174 | 0.16 | 0.16 | 0.16 | 0.16 | 0.13 | 0.10 | 0.08 | 0.08 |
| θ degrees | 0 | 23 | 45 | 66 | 83 | 95 | 113 | 126 | 131 | 162 | 177 | 187 | 188 |
| θ/α | 0 | 144 | 236 | 345 | 478 | 593 | 706 | 788 | 819 | 1,245 | 1,770 | 2,340 | 2,350 |

Figure 1:
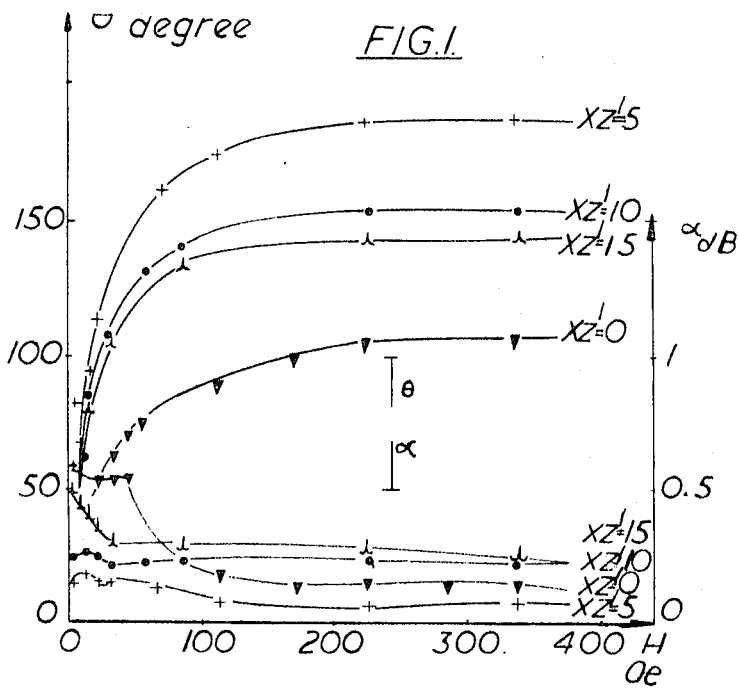
FIGURE 1 represents the variations of the attenuation $\alpha$ in db. and of the Faraday rotation $\theta$ in degrees as function of the continuous field H in oersteds applied to the ferrite with, as parameter, the molecular percentage of ($TiO_2NiO$) in the mixture before milling.

In FIGURE 1 are shown the values of α in db. and of θ in degrees as a function of the continuous longitudinal field applied to this first sample of ferrite for which the molecular percentage of ($TiO_2NiO$) is 5.

The effects of variation of the molecular percentage of ($TiO_2NiO$) have then been sought.

There is now considered a second ferrite sample in which the composition of the mixture before milling is the following $$35Fe_2O_3, 9MnO, 46MgO, 10(TiO_2NiO)$$

in molecular percentages, and the process of manufacture of the material being the same as that indicated for the first sample.

The sample of ferrite otbained is used in a Faraday rotator in the same conditions as those described for the first sample.

The results found are given in Table II.

TABLE II

| HOe | 0 | 3.4 | 6.8 | 11 | 17 | 28 | 56 | 85 | 225 | 338 |
|---|---|---|---|---|---|---|---|---|---|---|
| α dB | 0.24 | 0.24 | 0.24 | 0.26 | 0.24 | 0.22 | 0.24 | 0.24 | 0.24 | 0.24 |
| θ degrees | 0 | 17.5 | 40 | 61 | 85 | 110 | 130 | 141 | 153 | 153 |
| θ/α | 0 | 72.8 | 167 | 235 | 354 | 498 | 542 | 587 | 637 | 640 |

FIGURE 1 represents the variations of the characteristics θ and α as a function of the continuous applied field for this second sample for which the molecular percentage of ($TiO_2NiO$) is 10.

There is then considered a third sample of ferrite of which the molecular composition before milling is the following:

$$30Fe_2O_3, 9MnO, 46MgO, 15(TiO_2NiO)$$

in molecular percentages, and the process of manufacture is the same as for the first sample.

The sample of ferrite obtained is used in a Faraday rotator in the same conditions as those described for the first sample. The results found are given in Table III.

TABLE III

| HOe | 0 | 3.4 | 6.8 | 11 | 17 | 34 | 85 | 225 | 338 |
|---|---|---|---|---|---|---|---|---|---|
| α dB | 0.53 | 0.46 | 0.44 | 0.42 | 0.35 | 0.32 | 0.31 | 0.3 | 0.3 |
| θ degrees | 0 | 11 | 37.5 | 62 | 83 | 108 | 133 | 141 | 142 |
| θ/α | 0 | 26 | 85.2 | 148 | 237 | 337 | 429 | 470 | 475 |

FIGURE 1 represents the variations of the characteristics θ and α as a function of the continuous field applied to this third sample of ferrite for which the molecular percentage of ($TiO_2NiO$) is 15.

As comparison, there is represented on FIGURE 1 the variations of the characteristics θ and α as a function of the continuous field for a corresponding ferrite without ($TiO_2NiO$), i.e. with $X_2^1=0$.

These curves of FIGURE 1 show that the ferrite of the first sample is, by far, the best. As indicated above, a substitution, ($TiO_2QO$) pushed further, leads to high attenuations. The ferrite of the first sample is thus chosen to realise the ferrites, according to the present invention, described in the examples given hereinafter, in a non-limiting manner, and in which, to lessen the moment of saturation, a solid solution with the spinel structure titanate [$TiO_22MgO$] is realized.

Example 1

The composition of the mixture before milling is the following: 86.96 [$0.8Fe_2O_3$, 0.18 MnO, 0.92 MgO, 0.1 ($TiO_2NiO$)]13.04[$TiO_22MgO$] in molecular percentages. The ferrite [0.8 $Fe_2O_3$, 0.18MnO, 0.92MgO, 0.1($TiO_2NiO$)] is formed.

A start is made with pure oxides containing less than 0.05% by weight of impurities. These oxides are intimately milled in an iron mill with steel balls for 25 hours. The molecular percentages are given by the above formula, ($TiO_2NiO$) having been previously sintered at 1000° C. in air for 1 hour.

This mixture is then sintered at 1000° C. for one hour in air and remilled in a mill with steel balls for 24 hours, with the compound [$TiO_2·2MgO$] equally sintered at 1000° C. in air for one hour and with the percentages indicated by the formula.

The percentage of oxide of manganese is conventionally related to the number of manganese atoms, that is to say, conventionally represented by MnO, although, in practice, different oxides of manganese such as $MnO_2$, $Mn_3O_4$ could in practice be used.

The mixture is then compressed into the desired form and submitted to a heat treatment at the temperature of 1200° C. for 4 hours, in an atmosphere of oxygen. Cooling is carried out in 20 hours.

An example of use of this material taking advantage of the Faraday effect is given hereinafter.

A ferrite specimen in the form of a cylindrical rod of 16 mm. diameter and 40 mm. length is placed in a circular wave guide of 44.7 mm., diameter of a Faraday rotator, the axes of the guide and of the ferrite coinciding. Measurements are carried out at the frequency of 3,600 mHz.

The results obtained for the attenuation α, the Faraday rotation θ and the factor of merit θ/α, for different values of the continuous longitudinal field, at the temperature of +20° C. are given in Table IV.

TABLE IV

| HOe | 0 | 46 | 52 | 92 | 186 | 370 |
|---|---|---|---|---|---|---|
| θ degrees | 0 | 39 | 63 | 105 | 130 | 134 |
| α dB | 0.46 | 0.5 | 0.52 | 0.59 | 0.63 | 0.7 |
| θ/α | 0 | 78 | 119.2 | 177.8 | 206.3 | 191.4 |

Figure 2:
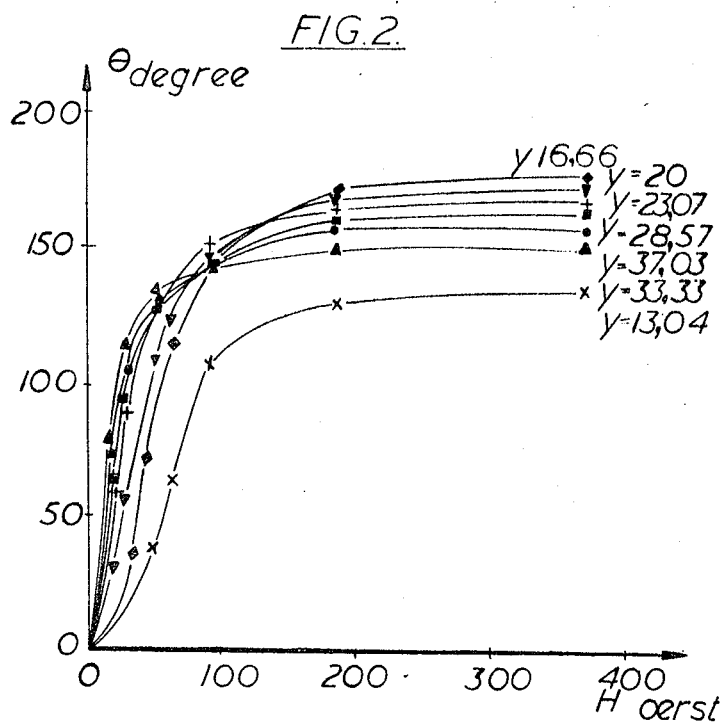
FIGURE 2 represents the variations of the Faraday rotation $\theta$ in degrees as function of the continuous field H in oersteds applied to the ferrite, for a ferrite according to the invention with, as parameter, the percentage of $[TiO_22MgO]$ in the mixture before milling.

On FIGURE 2 are represented the variations of θ in degrees as a function of the continuous applied field H in oersteds.

Example 2

The process of manufacture of the material is the same as for Example 1.

The composition of the mixture before milling is the following:

83.34 [$0.8Fe_2O_3$, 0.18MnO, 0.92MgO, 0.1($TiO_2NiO$)],
16.66 [$TiO_22MgO$]

in molecular percentages.

A specimen of the ferrite obtained is used in a Faraday rotator in the same conditions as those described for the specimen of Example 1. The results found are given in Table V and the variations of θ are represented in FIGURE 2.

TABLE V

| HOe | 0 | 30 | 46 | 62 | 92 | 184 | 370 |
|---|---|---|---|---|---|---|---|
| θ degrees | 0 | 36 | 71 | 115 | 142 | 170 | 173 |
| α dB | 0.32 | 0.40 | 0.44 | 0.52 | 0.60 | 0.65 | 0.7 |
| θ/α | 0 | 90 | 160.7 | 221.15 | 236.6 | 261.5 | 247.1 |

Example 3

The process of manufacture of the material is the same as for Example 1.

The composition of the mixture before milling is the folowing:

80 [$0.8Fe_2O_3$, 0.18MnO, 0.92MgO, 0.1($TiO_2NiO$)]
20[$TiO_2$, 2MgO]

A specimen of the ferrite obtained is used in a Faraday rotator in the same conditions as those described for Example 1. The results found are given in Table VI and the variations of θ are represented in FIGURE 2.

TABLE VI

| HOe | 0 | 30 | 46 | 62 | 92 | 184 | 370 |
|---|---|---|---|---|---|---|---|
| θ degrees | 0 | 56 | 108 | 124 | 145 | 167 | 171 |
| α dB | 0.38 | 0.42 | 0.65 | 0.7 | 0.75 | 0.77 | 0.8 |
| θ/α | 0 | 133.33 | 166.1 | 177.1 | 193.3 | 216.8 | 214.2 |

Example 4

The process of manufacture of the material is the same as for Example 1.

The composition of the mixture before milling is the following:

76.93[0.8Fe$_2$O$_3$, 0.18 MnO, 0.92 MgO, 0.1(TiO$_2$NiO)]
23.07[TiO$_2$2MgO]

in molecular percentages.

A specimen of the ferrite obtained is used in a Faraday rotator in the same conditions as those described for Example 1. The results found are given in Table VII and the variations of θ are represented in FIGURE 2.

TABLE VII

| HOe | 18 | 30 | 52 | 90 | 184 | 370 |
|---|---|---|---|---|---|---|
| θ degrees | 57 | 90 | 125 | 150 | 165 | 168 |
| α dB | 0.36 | 0.7 | 0.7 | 0.7 | 0.7 | 0.8 |
| θ/α | 0 | 128.5 | 178.5 | 214.2 | 235.7 | 210 |

Figure 3:
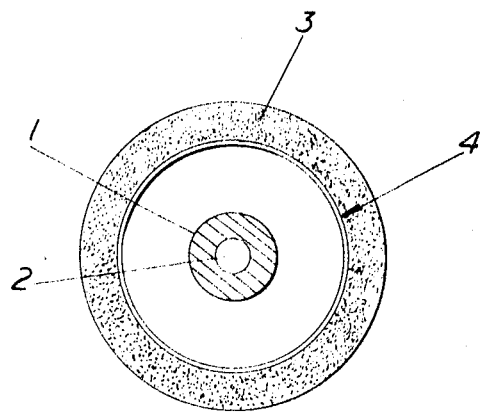
FIGURE 3 represents, in cross-section, a coaxial phase converter.

This ferrite has been used in a coaxial phase converter at 4,600 mHz. of the following type represented in cross-section in FIGURE 3.

A ferrite cylinder 1 is mounted on the central conductor 2. A winding 3 external to the conductor 4 furnishes a variable magnetic field parallel to the centre conductor.

With a ferrite specimen of 50 mm. length, the change of phase obtained is about 90°, at magnetic saturation of the ferrite, for an attenuation of about 0.2 to 0.3 db., in a band of frequencies from 4,600 to 5,200 mHz.

Example 5

The process of manufacture of the material is the same as for Example 1.

The composition of the mixture before milling is the following:

71.43[0.8Fe$_2$O$_3$, 0.18MnO, 0.92MgO, 0.1(TiO$_2$NiO)]
28.57[TiO$_2$2MgO]

in molecular percentages.

A ferrite specimen obtained is used in a Faraday rotator in the same conditions as those described in Example 1. The results found are given in Table VIII and the variations of θ are represented in FIGURE 2.

TABLE VIII

| HOe | 0 | 18 | 28 | 52 | 91 | 184 | 370 |
|---|---|---|---|---|---|---|---|
| θ degrees | 0 | 61 | 96 | 125 | 143 | 160 | 163 |
| α dB | 0.4 | 0.7 | 0.7 | 0.7 | 0.75 | 0.8 | 0.8 |
| θ/α | 0 | 87.14 | 137.14 | 178.6 | 190.6 | 200 | 203.7 |

This ferrite has been advantageously used in coaxial phase changers of the same type as before and operating near 2,800 mHz.

Figure 4:
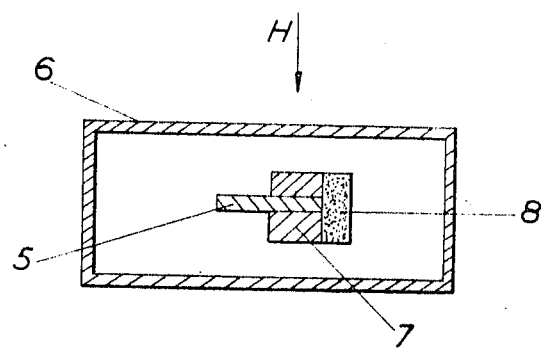
FIGURE 4 represents, in cross-section, a three plate unidirectional line.

It has also been used in a three plate unidirectional line (shown schematically in FIGURE 4 in cross-section) using the process described in the article of D. Fieri and C. Hanley, published in IRE transactions on Microwave Theory and Techniques, January 1959, pages 23 to 27 "Non Reciprocity in Dielectric Loaded T.E.M. Mode Transmission Lines."

The central conductor of the coaxial line is connected with the help of pins to a flat conductor 5, contained in a casing 6. On the flat central conductor 5 are stuck two plates 7 of ferrite, submitted to a continuous magnetic transverse field H, and also a small dielectric bar 8. The unidirectional lines, obtained by the aid of this set up, show a direct attenuation of 1.7 to 2 db. and an inverse attenuation of 25 to 30 db. for a range of frequencies of 300 to 500 mHz.

An identical set up and suitably dimensioned, operating at 1,400 mHz. has given a direct attenuation of 0.4 db. and an inverse attenuation of 30 db.

Example 6

The process of manufacture of the material is the same as for Example 1.

The molecular composition of the mixture before milling is the following:

68.97[0.8Fe$_2$O$_3$, 0.18MnO, 0.92MgO, 0.1(TiO$_2$NiO)]
31.03[TiO$_2$2MgO]

in molecular percentages.

A specimen of the ferrite obtained is used in a Faraday rotator in the same conditions as those described for Example 1. The results found are given in Table IX and the variations of θ are shown in FIGURE 2.

This ferrite has been used, in the same conditions as previously in unidirectional lines operating at 200 mHz.

TABLE IX

| HOe | 0 | 18 | 30 | 52 | 184 | 370 |
|---|---|---|---|---|---|---|
| θ degrees | 0 | 72 | 104 | 127 | 156 | 157 |
| α dB | 0.5 | 0.63 | 0.7 | 0.7 | 0.7 | 0.7 |
| θ/α | 0 | 114.2 | 148.5 | 181.4 | 222.8 | 214.2 |

Example 7

The process of manufacture of the material is the same as for Example 1.

The composition of the mixture before milling is the following:

66.67[0.8Fe$_2$O$_3$, 0.18MnO, 0.92MgO, 0.1(TiO$_2$NiO)]
33.33[TiO$_2$MgO]

in molecular percentages.

A specimen of the ferrite obtained is used in a Faraday rotator in the same conditions as those described in Example 1. The results found are given in Table X and the variations of θ are shown in FIGURE 2.

TABLE X

| HOe | 0 | 18 | 32 | 52 | 184 | 370 |
|---|---|---|---|---|---|---|
| θ degrees | 0 | 80 | 115 | 130 | 150 | 150 |
| α dB | 0.4 | 0.6 | 0.7 | 0.7 | 0.7 | 0.7 |
| θ/α | 0 | 133.3 | 164.3 | 185.7 | 214.2 | 214.7 |

What we claim is:

1. Ferromagnetic ferrite materials for use at microwave frequencies, said materials having a molecular composition after sintering of:

X[xLO, yR$_2$O$_3$, z(TO$_2$QO)], Y[TO$_2$2EO]

with

X+Y=100 and 8.5≤Y≤90 and 0.96≤x≤1.04, y+z=2−x and 0.01≤x≤0.9 where

L, Q and E each represent at least one bivalent metal selected from the group consisting of:

Ni$^{++}$, Fe$^{++}$, Mn$^{++}$, Co$^{++}$, Mg$^{++}$, Zn$^{++}$ and where

R represents at least one trivalent metal selected from the group consisting of:

Fe$^{+++}$, Cr$^{+++}$, Al$^{+++}$, Ga$^{+++}$, Mn$^{+++}$ and where

Fe$^{+++}$ is always present as ferric oxide Fe$_2$O$_3$, and constitutes at least three-quarters of the molecular total of R$_2$O$_3$, and T represents one or both tetravalent metals from the group consisting of: Ti$^{++++}$ and Sn$^{++++}$.

2. A method of making ferromagnetic ferrite materials for use at microwave frequencies, and having a molecular composition, after sintering of:

X[xLO, yR$_2$O$_3$, z(TO$_2$QO)], Y[TO$_2$2EO]

with $$X+Y=100 \text{ and } 8.5 \leq x \leq 90,$$

and $$0.96 \leq x \leq 1.04, \ y+z=2-x \text{ and } 0.01 \leq x \leq 0.9$$

where

L, Q and E each represent at least one bivalent metal selected from the group consisting of:

$$Ni^{++}, Fe^{++}, Mn^{++}, Co^{++}, Mg^{++}, Zn^{++},$$

and where

R represents at least one trivalent metal selected from the group consisting of:

$$Fe^{+++}, Cr^{+++}, Al^{+++}, Ga^{+++}, Mn^{+++}$$

and where $Fe^{+++}$ is always present as ferric oxide $Fe_2O_3$, and constitutes at least three-quarters of the molecular total of $R_2O_3$, and T represents one or both tetravalent metals from the group consisting of: $Ti^{++++}$ and $Sn^{++++}$, which method includes the steps of
(a) preparing the compound $(TO_2QO)$,
(b) forming a titanate having a corundum structure by sintering said prepared compound at about 1000° C. in air for about one hour,
(c) mixing the thus prepared corundum titanate with metal oxides to form a compound defined by the formula $$[xLO, yR_2O_3, z(TO_2QO)]$$

(d) grinding the thus formed mixture, then
(e) preparing the compound $[TO_22EO]$ and sintering said prepared compound in air at about 1000° C. for about one hour,
(f) combining the thus sintered compound $(TO_22EO)$ with the compound $[xLO, yR_2O_3, z(TO_2QO]$ in the desired proportions,
(g) grinding the combined mixture,
(h) forming the ground mixture into cores,
(i) slowly heating said cores in an oxygen atmosphere for several hours at a temperature of about 1200° C., and thereafter slowly cooling the cores in an oxygen atmosphere for about 20 hours.

3. A method as claimed in claim 2, and in which the compound $[xLO, yR_2O_3, z(TO_2QO)]$ is presintered in air at about 1000° C. for about one hour before being combined with the compound $(TO_2EO)$.

4. A method as claimed in claim 2 or claim 3 and in which the cores are first heated at a temperature of about 800° C. for several hours and thereafter heated at a temperature of about 1200° C. for four to five additional hours.

References Cited

FOREIGN PATENTS 1,354,231  1/1964  France.
979,953  1/1965  Great Britain.

TOBIAS E. LEVOW, Primary Examiner

J. COOPER, Assistant Examiner

U.S. Cl. X.R.

252—62.56, 62.58, 62.59, 62.64